United States Patent
Doyle et al.

(10) Patent No.: US 9,448,778 B2
(45) Date of Patent: *Sep. 20, 2016

(54) OPTIMIZING COMPILER PERFORMANCE BY OBJECT COLLOCATION

(71) Applicant: International Business Machines Corporation, Armonk, NY (US)

(72) Inventors: Patrick Doyle, Toronto (CA); Pramod Ramarao, Toronto (CA); Vijay Sundaresan, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/447,381

(22) Filed: Jul. 30, 2014

(65) Prior Publication Data

US 2014/0344794 A1    Nov. 20, 2014

Related U.S. Application Data

(63) Continuation of application No. 12/858,001, filed on Aug. 17, 2010, now Pat. No. 8,826,256.

(30) Foreign Application Priority Data

Aug. 27, 2009    (CA) ..................... 2675686

(51) Int. Cl.
*G06F 9/45* (2006.01)
(52) U.S. Cl.
CPC .............. *G06F 8/443* (2013.01); *G06F 8/4442* (2013.01)
(58) Field of Classification Search
None
See application file for complete search history.

(56) References Cited

U.S. PATENT DOCUMENTS

| | | | |
|---|---|---|---|
| 6,038,397 A | 3/2000 | Iwanishi et al. | |
| 6,289,360 B1 | 9/2001 | Kolodner et al. | |
| 6,636,866 B1 | 10/2003 | Ramalingam | |
| 6,959,430 B2 | 10/2005 | Sokolov et al. | |
| 7,076,804 B2 | 7/2006 | Kershenbaum et al. | |
| 7,174,546 B2 * | 2/2007 | Koseki ................... | G06F 8/441 717/149 |
| 7,596,667 B1 | 9/2009 | Detlefs et al. | |
| 2002/0092005 A1 * | 7/2002 | Scales ..................... | G06F 8/443 717/162 |
| 2003/0149969 A1 * | 8/2003 | Ogasawara ........... | G06F 8/4435 717/158 |

(Continued)

OTHER PUBLICATIONS

Muchnick, "Advanced Compiler Design and Implementation", 13.3 Partial-Redundancy Elimination and 13.4 Redundancy Elimination and Reassociation, Copyright 1997, pp. 407-415 (5 pages).

(Continued)

*Primary Examiner* — Lewis A Bullock, Jr.
*Assistant Examiner* — Christine Dang
(74) *Attorney, Agent, or Firm* — Yee & Associates, P.C.; Parashos Kalaitzis

(57) ABSTRACT

A computer-implemented method, system, and computer program product for performing object collocation on a computer system are provided. The method includes analyzing a sequence of computer instructions for object allocations and uses of the allocated objects. The method further includes creating an allocation interference graph of object allocation nodes with edges indicating pairs of allocations to be omitted from collocation. The method also includes coloring the allocation interference graph such that adjacent nodes are assigned different colors, and creating an object allocation at a program point prior to allocations of a selected color from the allocation interference graph. The method additionally includes storing an address associated with the created object allocation in a collocation pointer, and replacing a use of each allocation of the selected color with a use of the collocation pointer to collocate multiple objects.

14 Claims, 6 Drawing Sheets

(56) References Cited

U.S. PATENT DOCUMENTS

2010/0191928 A1 7/2010 Hawblitzel
2011/0055819 A1 3/2011 Doyle et al.

OTHER PUBLICATIONS

Muchnick, "Advanced Compiler Design and Implementation", 8.6 Control-Tree-Based Data-Flow Analysis, Copyright 1997, pp. 236-250 (8 pages).

Sun Microsystems, Inc., "Conversions and Promotions", Java Language Specification, Third Edition, Copyright 1996-2005, (24 pages).

Office Action, dated Jul. 8, 2013, regarding U.S. Appl. No. 12/858,001, 21 pages.

Final Office Action, dated Jan. 28, 2014, regarding U.S. Appl. No. 12/858,001, 22 pages.

Notice of Allowance, dated Apr. 23, 2014, regarding U.S. Appl. No. 12/858,001, 10 pages.

\* cited by examiner

OPTIMIZING COMPILER PERFORMANCE BY OBJECT COLLOCATION

CROSS-REFERENCE TO RELATED APPLICATION(S)

This application is a continuation of and claims the benefit of priority to U.S. patent application Ser. No. 12/858,001, filed on Aug. 17, 2010 and entitled "Optimizing Compiler Performance by Object Collocation", which claims priority to Canadian Patent Application No. 2675686, filed on Aug. 27, 2009. The contents of both aforementioned applications are incorporated herein by reference.

BACKGROUND

1. Field

The present invention relates generally to computer software compiler optimization, and more specifically, to optimizing compiler performance by performing object collocation at compile time.

2. Description of the Related Art

In computer software compiler design, optimizations can be applied to enhance various attributes of the resulting compiled code. Optimizations may target reducing execution time and/or memory usage. One type of optimization in object-oriented programs is scalarization, in which an object is "exploded" into its individual fields. After scalarization, the exploded object is no longer considered an object; rather, it is replaced by a local variable for each field of the original object. These local variables can be aggressively optimized, and even eliminated altogether if they are found to be unnecessary. Scalarization of an object may eliminate overhead imposed on that object by the object-oriented programming paradigm.

Scalarization has restrictions, and may not be performed under all circumstances. For example, if a dereference of a pointer variable (i.e., a value pointed to by the pointer variable) can be reached by two different definitions of that pointer, then the dereferencing semantics are retained so that the proper object will be used. This means that fields accessed by such dereferences should reside in memory occupying the same offset to ensure that field load operations can be implemented efficiently and unambiguously. As a second example, if an object reference is used and updated inside of a loop, and is also initialized outside of the loop, then the use in the loop is reached by two definitions, so none of the objects involved can be scalarized. In practice, these restrictions prevent scalarization of such objects.

SUMMARY

An exemplary embodiment is a computer-implemented method for performing object collocation on a computer system. The method includes analyzing a sequence of computer instructions for object allocations and uses of the allocated objects. The method further includes creating an allocation interference graph of object allocation nodes with edges indicating pairs of allocations to be omitted from collocation. The method also includes coloring the allocation interference graph such that adjacent nodes are assigned different colors, and creating an object allocation at a program point prior to allocations of a selected color from the allocation interference graph. The method additionally includes storing an address associated with the created object allocation in a collocation pointer, and replacing a use of each allocation of the selected color with a use of the collocation pointer to collocate multiple objects.

Another exemplary embodiment is a system for object collocation. The system includes a compiler and allocation interference logic configured to execute on a processing system to analyze a sequence of computer instructions in memory of the processing system for object allocations and uses of the allocated objects. The system is further configured to create an allocation interference graph of object allocation nodes with edges indicating pairs of allocations to be omitted from collocation, and color the allocation interference graph such that adjacent nodes are assigned different colors. The system is also configured to create an object allocation at a program point prior to allocations of a selected color from the allocation interference graph. The system is additionally configured to store an address associated with the created object allocation in a collocation pointer, and replace a use of each allocation of the selected color with a use of the collocation pointer to collocate multiple objects in the memory of the processing system.

A further exemplary embodiment is a computer program product for performing object collocation. The computer program product includes a storage medium readable by a processing circuit and storing instructions for execution by the processing circuit for implementing a method. The method includes analyzing a sequence of computer instructions for object allocations and uses of the allocated objects, and creating an allocation interference graph of object allocation nodes with edges indicating pairs of allocations to be omitted from collocation. The method further includes coloring the allocation interference graph such that adjacent nodes are assigned different colors, and creating an object allocation at a program point prior to allocations of a selected color from the allocation interference graph. The method also includes storing an address associated with the created object allocation in a collocation pointer, and replacing a use of each allocation of the selected color with a use of the collocation pointer to collocate multiple objects.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments provide compiler optimization by performing object collocation at compile time. Object collocation supports memory management optimization where two separate objects are turned into two uses of the same object. In an exemplary embodiment, compiler analysis is performed that determines, at compile time, when multiple objects are not used simultaneously, and allocates those objects to the same location in memory. A combination of analysis logic is applied to prove that objects can be collocated safely such that functional behavior of a program creating and using the objects is the same before and after object collocation is performed. While prior art collocation may involve locating two objects next to each other, the object collocation performed by exemplary embodiments automatically transforms program code to replace multiple dynamically allocated objects with multiple uses of a single object.

Figure 1:
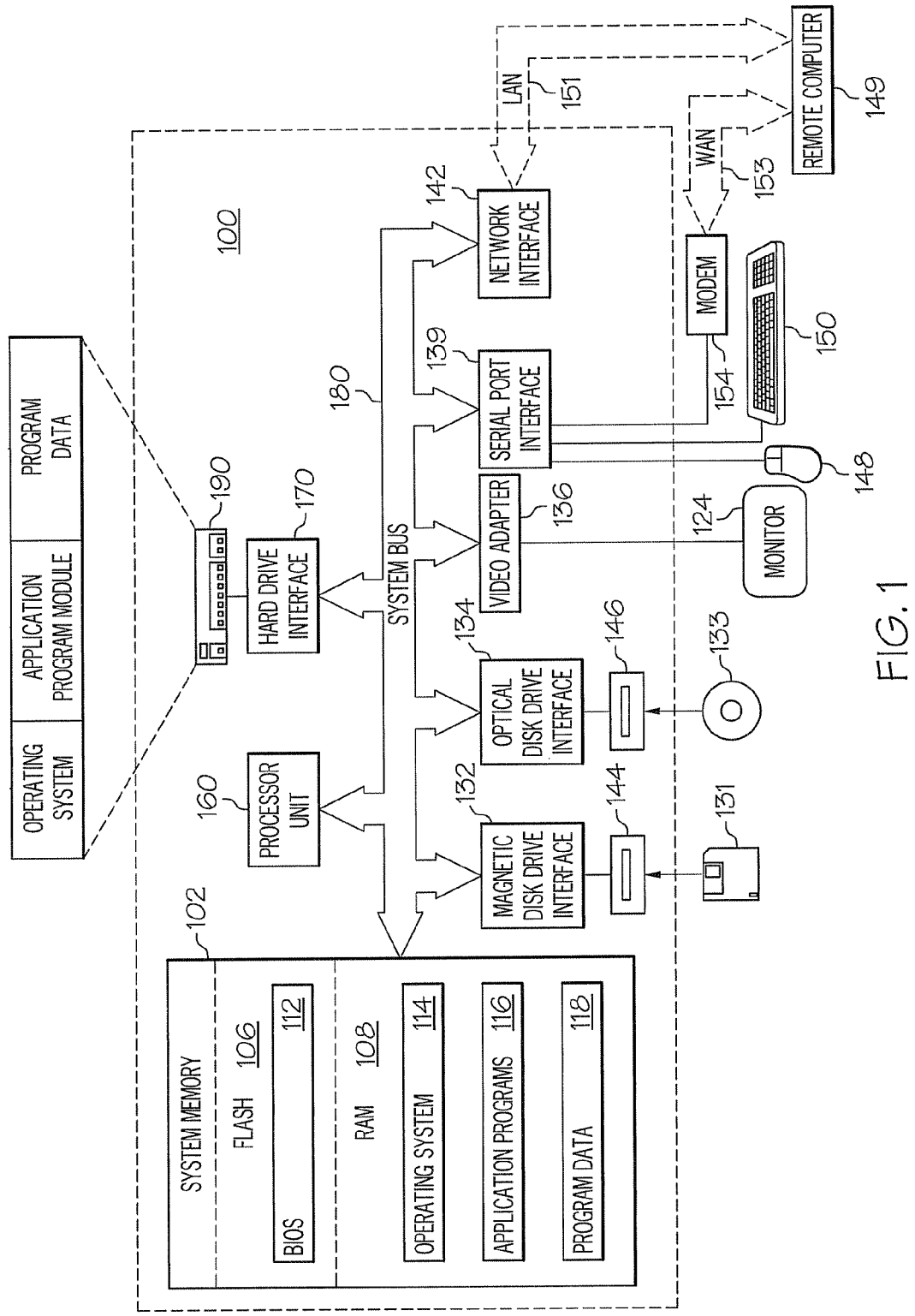
FIG. 1 depicts a block diagram illustrating an exemplary computer system that may be utilized to implement exemplary embodiments of the present invention.

Turning now to the drawings, it will be seen that in FIG. 1 there is a block diagram of a processing system 100 upon which object collocation is implemented in exemplary embodiments. For discussion purposes, the processing system 100 is described as having features common to a personal computer, such as a desktop or portable computer. As used herein, however, the terms "processing system," "computer," and the like are intended to mean essentially any type of computing device or machine that is capable of receiving, storing, and running a software product, including such devices as communication devices and personal and home consumer devices supporting software development. Thus, the processing system 100 may also be referred to as a development processing system, since the processing system 100 can be used to develop and compile software for execution on the processing system 100 or on other computer systems (not depicted).

Processing system 100, as provided in FIG. 1, is configured as a personal computer that generally includes a processing unit 160, a system memory 102, and a system bus 180 that couples system memory 102 to processing unit 160. The system memory 102 includes non-volatile memory 106 and random access memory (RAM) 108. Non-volatile memory 106 is an electrically erasable programmable read only memory (EEPROM) module that includes a basic input/output system (BIOS) 112, which may be implemented in flash memory. BIOS 112 contains the basic routines that facilitate transfer of information between elements within processing system 100, such as during start-up.

Processing system 100 further includes a hard disk drive 190, a magnetic disk drive 144 (which can be used to read from or write to a removable disk 131), and an optical disk drive 146 (which can be used to read a CD-ROM disk 133 or read or write to other optical media). Hard disk drive 190, magnetic disk drive 144, and optical disk drive 146 are electrically communicatively coupled to system bus 180 by a hard disk drive interface 170, a magnetic disk drive interface 132, and an optical drive interface 134, respectively. The drives and their associated computer-readable media provide nonvolatile storage for processing system 100. Although the description of computer-readable media above refers to a hard disk, a removable magnetic disk and a CD-ROM disk, it should be appreciated that other types of media that are readable by a computer, such as magnetic cassettes, flash memory cards, digital video disks, Bernoulli cartridges, and the like, may also be used in exemplary computer operating environments. Likewise, one or more of the hard disk drive 190, magnetic disk drive 144, and optical disk drive 146 can be omitted within the scope of the invention.

A number of program modules may be stored in the drives and RAM 108, including an operating system 114, application program modules 116 (such as, for example, development applications), and program data 118. A user may enter commands and information into processing system 100 through a keyboard 150 and/or a mouse 148. Other input devices (not shown) may include, for example, a microphone, joystick, game pad, satellite dish, scanner, or the like. These and other input devices are often connected to processing unit 160 through a serial port interface 139 that is coupled to system bus 180, but may be connected by other interfaces, such as a game port or a universal serial bus (USB). A monitor 124 or other type of display device is also connected to system bus 180 via an interface, such as a video adapter 136. In addition to the monitor, the exemplary computer operating environment may also include other peripheral output devices (not shown), such as speakers or printers.

Processing system 100 may operate in a networked environment using logical connections to one or more remote computers, such as a remote computer 149. Remote computer 149 may be, for example, a server, a router, a peer device, or another common network node, and may include many or all of the elements described in relation to processing system 100. The logical connections depicted in FIG. 1 include a local area network (LAN) 151 and a wide area network (WAN) 153.

When used in a LAN networking environment, processing system 100 is connected to LAN 151 through a network interface 142. When used in a WAN networking environment, processing system 100 includes a modem 154 or other means for establishing communications over WAN 153, such as the Internet. Modem 154, which may be internal or external to processing system 100, is connected to system bus 180 via serial port interface 139. In a networked environment, program modules depicted relative to processing system 100, or portions thereof, may be stored in the remote memory storage device. It will be appreciated that the network connections shown are exemplary and other means of establishing a communications link between the computers may be used.

Figure 2:
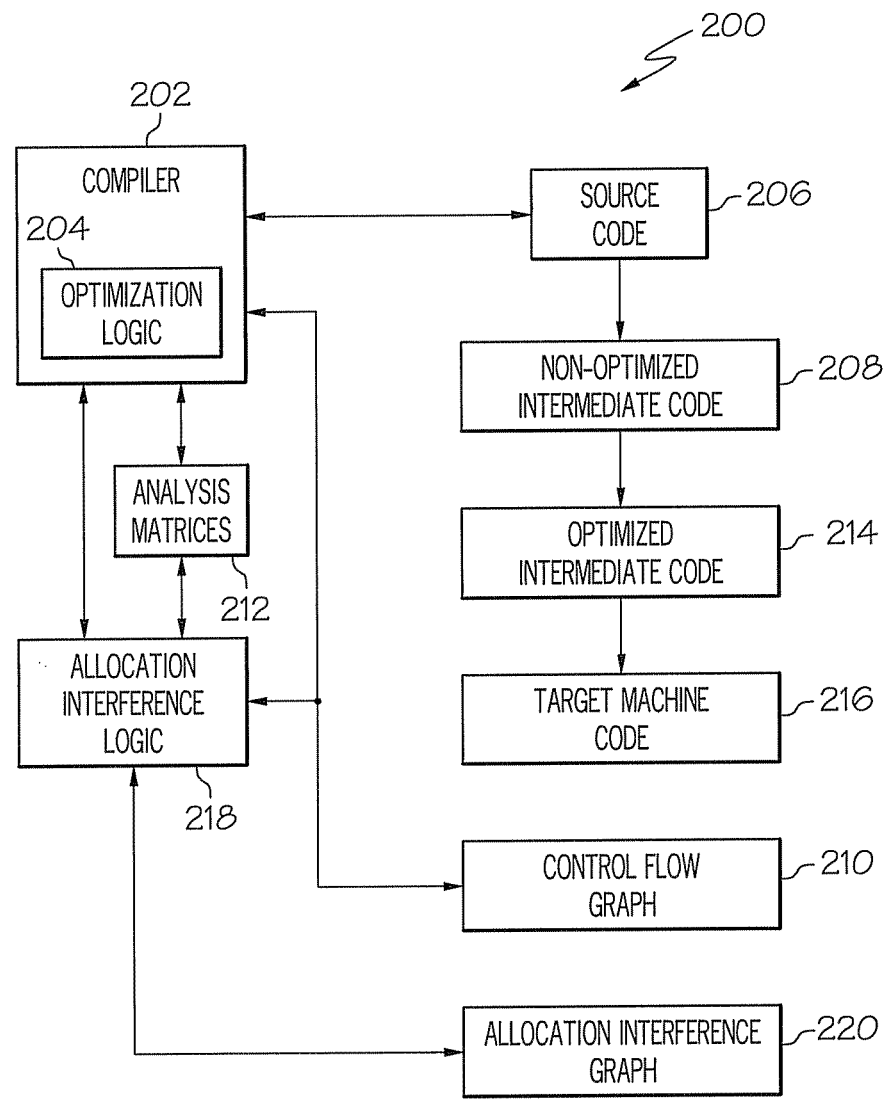
FIG. 2 depicts an example of a development system capable of implementing object collocation in accordance with exemplary embodiments.

Exemplary embodiments of the present invention may be implemented in conjunction with a development environment that includes one or more development applications, such as a compiler, a linker, a version control system, and/or a graphical integrated development environment (IDE). FIG. 2 depicts an example of a development system 200 that may be implemented on or in conjunction with the processing system 100 of FIG. 1. The development system 200 includes a compiler 202 with optimization logic 204. The compiler 202 interfaces with source code 206 representing a sequence of instructions prior to compilation. The compiler 202 can perform lexical and semantic analysis and parse the source code 206 into program points or blocks to create non-optimized intermediate code 208. The compiler 202 can also create various flow graphs and matrices, such as control flow graph 210 and analysis matrices 212 to support code analysis. The control flow graph 210 can be part of the non-optimized intermediate code 208 and/or the optimized intermediate code 214. The non-optimized intermediate code 208 and the optimized intermediate code 214 may also be referred to collectively as an intermediate representation. The compiler 202 can invoke the optimization logic 204 to optimize the non-optimized intermediate code 208 and produce optimized intermediate code 214. The compiler 202 can then convert the optimized intermediate code 214 into target machine code 216, which may be an executable format or other format suitable for linking as part of a larger computer program.

As part of the optimization, the compiler 202 interacts with allocation interference logic 218 in support of object collocation optimization. While the allocation interference logic 218 is depicted separately from the compiler 202, it will be understood that the allocation interference logic 218 can be integrated with the compiler 202, for instance, as part of the optimization logic 204. The optimization logic 204 can include a number of analysis techniques which may be known in the art, such as liveness analysis, may-point-to analysis, escape analysis, partial redundancy elimination, alias analysis, and/or scalarization logic. During the process of analyzing the source code 206 and the non-optimized intermediate code 208, variable and object creation, access, and modification are tracked. The allocation interference logic 218 is used in support of object collocation, where objects are analyzed to determine if they can share memory space or be eliminated. The allocation interference logic 218 can analyze a sequence of computer instructions embodied in the non-optimized intermediate code 208 and create/modify an allocation interference graph 220 and the analysis matrices 212 to indicate potential interferences between object allocations and pointers. Once the potential interferences have been identified, further analysis is performed to determine whether the object allocations associated with the potential interferences can be collocated or should remain separate.

Data structures such as the control flow graph 210, the analysis matrices 212, and the allocation interference graph 220 can be stored in volatile computer memory, such as the RAM 108 of FIG. 1, as part of the compilation and optimization processes. The source code 206, non-optimized intermediate code 208, optimized intermediate code 214, and target machine code 216 can be stored in the RAM 108 of FIG. 1. Additionally, remote storage may be used for any portion of the development system 200, for instance, on remote computer 149 of FIG. 1 and associated storage facilities.

In exemplary embodiments, the allocation interference logic 218 performs analysis during compilation to determine whether pairs of object allocations interfere with each other, referred to as "allocation interference". If two object allocations interfere, the objects cannot be collocated. The analysis allocation interference logic 218 may invoke a combination of liveness analysis and may-point-to analysis of the optimization logic 204. Liveness analysis can track, at each program point in the non-optimized intermediate code 208, which local variables contain values that may be used at a later point in the program. May-point-to analysis identifies which local pointer variables may point to the objects created at each allocation site in the non-optimized intermediate code 208, writing results to the analysis matrices 212.

The allocation interference logic 218 can perform a flow-sensitive alias analysis to produce, at each program point of the non-optimized intermediate code 208, a matrix in the analysis matrices 212 with a row for each local pointer and a column for each local allocation. The allocation interference logic 218 sets an indicator in the analysis matrices 212 for pointer and object allocation pairs indicating that the pointer may point to the object allocation. The allocation interference logic 218 may use the results of liveness analysis of the optimization logic 204 to clear out rows in the analysis matrices 212 representing dead pointers.

The allocation interference logic 218 can handle of number of scenarios that may otherwise prevent object collocation while also avoiding object collocation where the observable behavior of the resulting program (e.g., target machine code 216 resulting from the optimized intermediate code 214) would be altered. Examples of program behavior alteration to avoid in determining whether object collocation can be applied include an address comparison indicating that two object references are equal when they would otherwise have been unequal, and a field load returning a value that would not have otherwise been returned had the objects been kept separate.

Tables 1 and 2 represent exemplary sequences of computer instructions that may be included in the source code 206, which traditional scalarization algorithms would prevent optimization, but may be optimized using the allocation interference logic 218.

TABLE 1

Use of pointer reachable by two definitions

| Instructions | Comments |
| --- | --- |
| int getLength(Foo f){<br>  x = f;<br>  if (x == null)<br>    x = new Foo( );<br>  return x.length;<br>} | Definition #1 of x<br><br>Definition #2 of x<br>Use of x |

TABLE 2

Use of pointer reachable by two local allocations

| Instructions | Comments |
| --- | --- |
| Integer power(Integer base, int exp){<br>  Integer x = new Integer(1);<br>  For (int i = 0; i < exp; i++)<br>    x = new Integer(<br>      x.getInt( )<br>      * base.getInt( ));<br>  return x;<br>} | Definition #1 of x<br><br>Definition #2 of x<br>Use of x |

Figure 3:
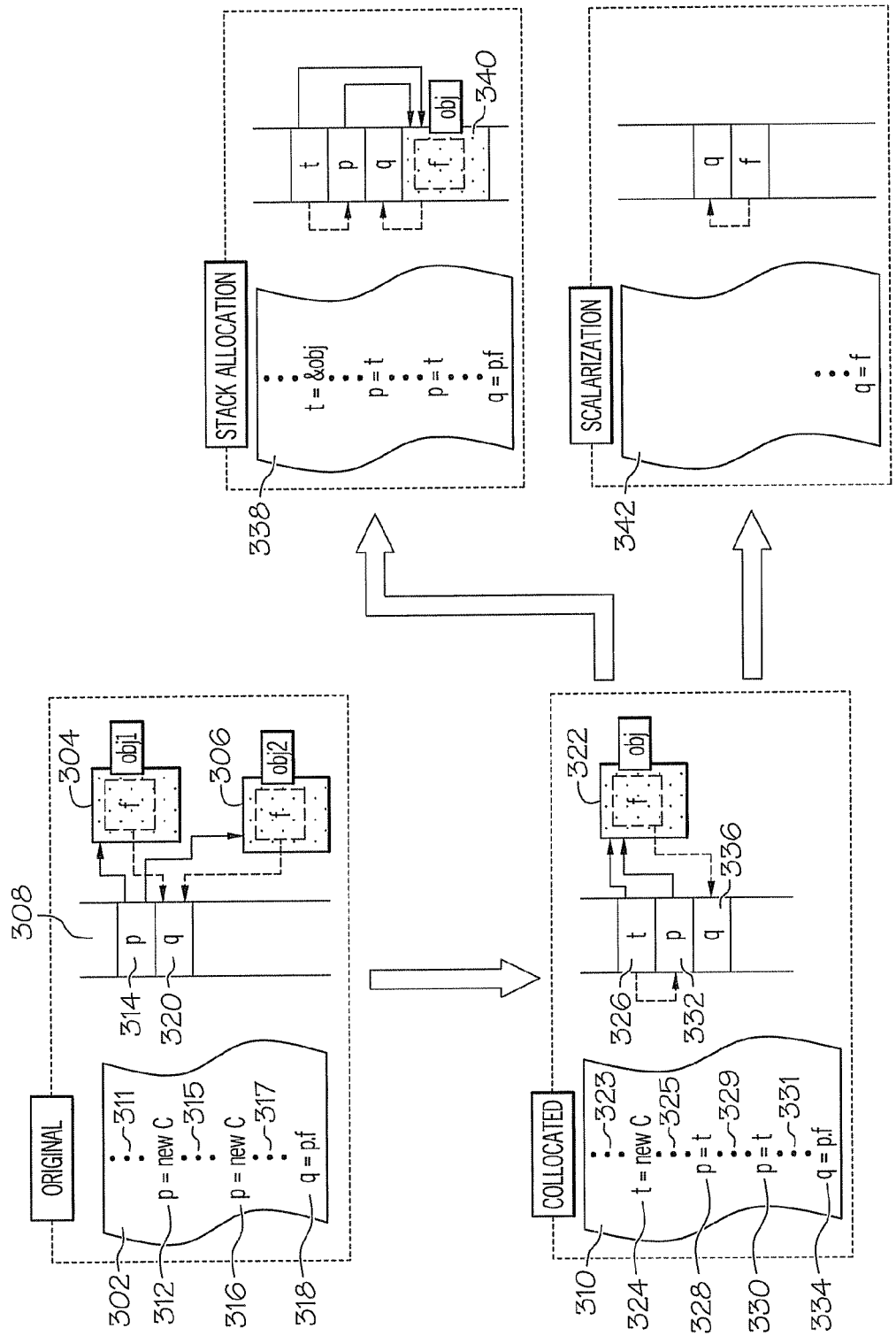
FIG. 3 depicts an example of source code optimizations in accordance with exemplary embodiments.

FIG. 3 provides a graphical example of pointers, objects, memory allocation, and analysis results before and after the allocation interference logic 218 is applied, as well as additional optimizations that can be applied by the optimization logic 204 of FIG. 2. A sequence of instructions in source code 302 can result in the creation of multiple heap allocated objects 304 and 306 with associated pointers in stack 308. Upon applying the allocation interference logic 218 of FIG. 2 to the source code 302, functionally equivalent optimized code 310 is produced. At line 312 in the source code 302, pointer p 314 points to heap allocated object 304 at address obj1. At line 316 in the source code 302, pointer p 314 points to heap allocated object 306 at address obj2. At line 318 in the source code 302, pointer q 320 is assigned the value of field f through pointer p 314, which may be assigned from either of the heap allocated objects 304 and 306 depending on the current object that may be pointed to by pointer p 314. The source code 302 also includes code sequences 311, 315, and 317 which can include control flow altering instructions that make it uncertain as to whether lines 316, 318, or both execute prior to executing line 318.

Upon determining that the heap allocated objects 304 and 306 can be collocated since they need not exist simultaneously and they do not have interferences, they can be consolidated to a single heap allocated object 322. The compiler 202 in conjunction with the allocation interference logic 218 of FIG. 2 can reduce the object allocations of lines 312 and 316 into a single object allocation at line 324 using collocation pointer t 326. Lines 328 and 330 are modifications of lines 312 and 316, with pointer t 326 assigned to pointer p 332, which points to heap allocated object 322. Therefore, both pointer p 332 and pointer t 326 may point to heap allocated object 322. At line 334, pointer q 336 is assigned the value of field f from the heap allocated object 322. The optimized code 310 also includes optimized code sequences 323, 325, 329, and 331, similar to code sequences 311, 315, and 317.

After collocation optimizations, the compiler 202 can initiate other optimizations using the optimization logic 204 of FIG. 2. For example, stack allocation optimized source code 338 can convert the heap allocated object 322 to a stack allocated object 340. Alternatively, the optimization logic 204 can perform scalarization on the optimized code 310 to produce scalarization optimized source code 342, where unnecessary intermediate assignments are eliminated. Due to the multiple definitions of pointer p 314 in the source code 302, scalarization may not be directly performed on the source code 302. However, after object collocation is performed using the allocation interference logic 218, scalarization can be performed on the optimized code 310 to produce the scalarization optimized source code 342.

Figure 4:
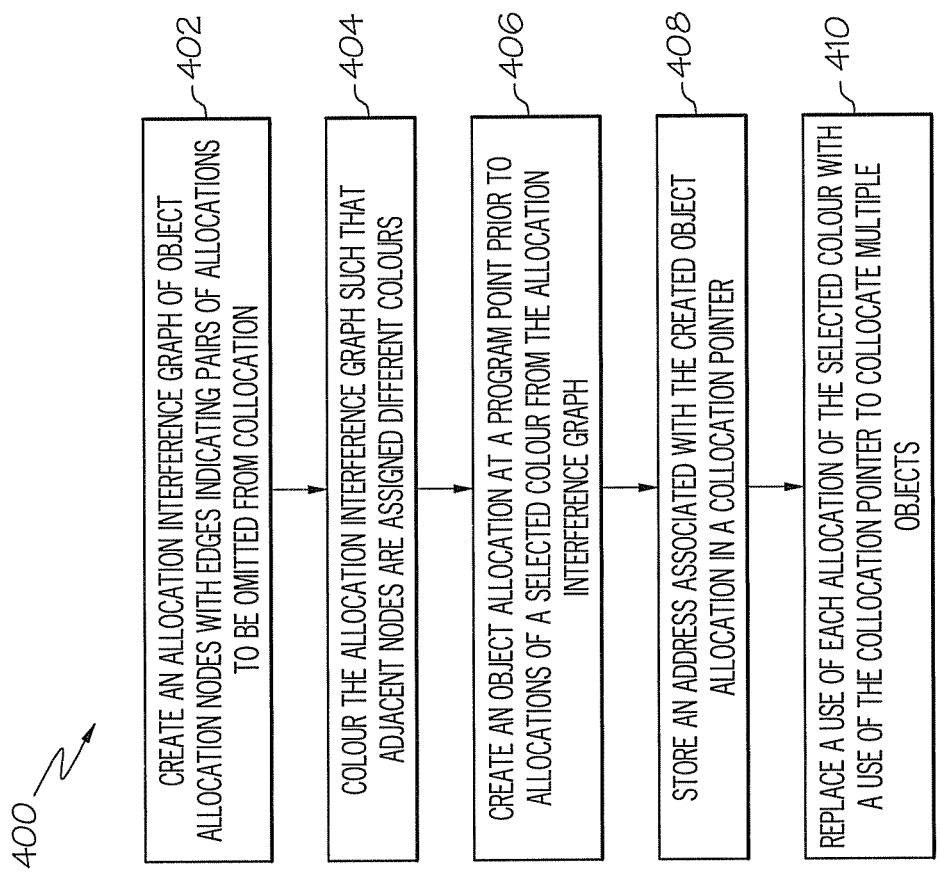
FIG. 4 depicts an example of a process for object collocation in accordance with exemplary embodiments.

Turning now to FIG. 4, a process 400 for performing object collocation will now be described in accordance with exemplary embodiments, and in reference to FIGS. 1-3. The compiler 202 may initially perform a liveness analysis on a sequence of computer instructions, such as the source code 206 or the non-optimized intermediate code 208, using the optimization logic 204. The liveness analysis may identify dead pointers that are not used at a later point of program execution. The compiler 202 and/or the allocation interference logic 218 can create a matrix in the analysis matrices 212 of pointer-object allocation pairs for the sequence of computer instructions to indicate which pointers may point to object allocations (i.e., a "may-point-to" matrix). The results of the liveness analysis can be used to clear out the matrix to remove the identified dead pointers, leaving live pointers in the matrix.

Figure 5:
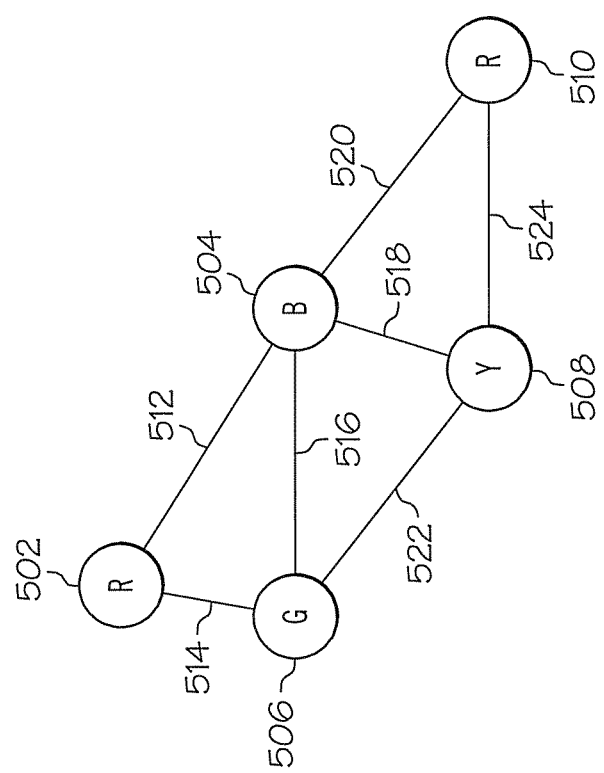
FIG. 5 depicts an example of an allocation interference graph in accordance with exemplary embodiments.

At block 402, the allocation interference logic 218 creates the allocation interference graph 220 with nodes representing object allocations, and edges indicating pairs of allocations that interfere, and hence cannot be collocated. The edges indicate pairs of allocations to be omitted from collocation. At block 404, the allocation interference logic 218 colors the allocation interference graph 220 such that adjacent nodes are assigned different colors. An example of the allocation interference graph 220 with different colors is depicted in FIG. 5, where nodes 502, 504, 506, 508, and 510 represent object allocations, and edges 512, 514, 516, 518, 520, 522, and 524 indicate potential interference relationships between the nodes 502-510. Nodes 502-510 include labels indicating color codes, such as "R" for red, "G" for green, "B" for blue, and "Y" for yellow. The "colors" need not represent actual colors, but may simply be numeric codes.

At block 406, the allocation interference logic 218 and/or the compiler 202 creates an object allocation at a program point prior to allocations of a selected color from the allocation interference graph 220. At block 408, allocation interference logic 218 and/or the compiler 202 stores an address associated with the created object allocation in a collocation pointer. At block 410, the allocation interference logic 218 and/or the compiler 202 replaces a use of each allocation of the selected color with a use of the collocation pointer to collocate multiple objects. An example implementation of blocks 406-410 is depicted with the insertion of line 324 in the optimized code 310 of FIG. 3. The allocation interference logic 218 may replace each allocation of the selected color with a code to zero-out fields of the object pointed to by the collocation pointer. Blocks 406-410 can be repeated for each color in the allocation interference graph 220; however, the analysis may be skipped for any color that has only one node and is not in a loop to further enhance processing efficiency.

A variety of algorithms known in the art may be used to minimize the number of colors in the allocation interference graph 220. In an exemplary embodiment, the allocation interference logic 218 applies a branch-and-bound minimization algorithm with limited backtracking to avoid exponential worst-case complexity. By coloring nodes in descending order of degree, a good initial coloring is quickly achieved, allowing a branch-and-bound phase to proceed quickly. A backtracking limit can be selected to produce any desired asymptotic complexity. Other metrics and approaches may be used, such as maximizing to expose scalarization opportunities in object collocation. For example, the allocation interference logic 218 can compute combined "hotness" of each pointer use whose number of reaching definitions would be reduced to one (1) if collocation were to use a given color. Maximizing this function may maximize the benefit of a subsequent scalarization optimization.

In an exemplary embodiment, to create the allocation interference graph 220, the allocation interference logic 218 indicates an interference at each object allocation node with every object allocation that may be pointed to by a live pointer as identified using a matrix from the analysis matrices 212. The allocation interference logic 218 also indicates an interference for each field store through a live pointer at each allocation node that may be pointed to by another live pointer. The allocation interference logic 218 also indicates an interference at each comparison between a pair of live pointers, where each method call in the sequence of computer instructions taking one of the live pointers as an argument is treated as a field store, and each method call taking the pair of live pointers is treated as a comparison between the pair of live pointers.

Self-interfering allocations can be removed from the allocation interference graph 220. However, not all self-interfering allocations need to be removed from the allocation interference graph 220. Self-interfering allocations cannot be ignored, because they are at risk of having instances from two different loop iterations live at the same time as a loop-carried self-interference. Moving such loop carried interferences out of a loop may not be possible. However, to simply reject all self-interfering allocations from consideration for collocation is overly conservative. Table 3 illustrates an example that contains a self-interfering allocation, yet has no actual loop-carried self-interference.

TABLE 3

Harmless self-interfering allocation

| Line | Instructions | Comments |
|------|-------------|----------|
| 1 | Object p = new X( ); | Allocation A |
| 2 | Object q = p; | q may point to A |
| 3 | p.field = 123; | Field store through p while q is live |
| 4 | q = new X(q.field); | Allocation B |

Line 3 of Table 3 shows an assignment to a field called "p.field". The analysis correctly determines that the assignment via pointer p could affect the field value observed via pointer q at Line 4 of Table 3, and therefore considers the objects pointed to by p and q (namely, allocation A itself) to be interfering. However, it should be noted that p and q in this example actually point to the same object in the source code, so having changes via p become observable via q is the desired behaviour. Danger occurs when p and q may point to different objects from the same allocation A. The only way for this to happen is for A to execute twice, and the only way for an allocation to execute twice is for it to be in a loop. The use of danger indicators can prevent such unnecessary self-interferences. Danger indicators can be implemented as single bit columns or multi-bit code words.

A further improvement in the allocation interference logic 218 of FIG. 2 is to reject only self-interferences that are loop-carried. One way to determine this property is to unroll the loop, thereby duplicating all the allocations within the loop, and find all allocations from the first copy of the loop that interfere with their clone from the second copy. Allocations with no such interference cannot have a loop-carried self-interference. However, unrolling every loop can result in an increase in code size exponential in the depth of the deepest loop nest; thus, loop unrolling may only be used for limited scenarios. To implement per-allocation danger indicators, an extra column is added to may-point-to matrices of the analysis matrices 212 for each allocation. This results in two columns per allocation, a may-point-to column and danger indicators for the associated allocation. A set of control edges is identified such that, when the control edges are removed, the resulting graph is acyclic. In one embodiment, all natural-loop back-edges are included in the identified set of control edges. During may-point-to dataflow analysis, matrices from predecessor blocks can be composed using a bit-matrix union for all incoming edges not in the identified set of control edges. For edges in the identified set of control edges, pre-processing is performed to indicate the danger condition. Before performing the bit-matrix union, the matrix is modified from an edge as follows: the danger indicator column for an allocation A is computed as the union of the danger indicator column and may-point-to column of A, and the may-point-to column for an allocation A is cleared.

In an exemplary embodiment, the allocation interference logic 218 tracks which pointers may point to values that have flowed through the code from a loop entry block, and uses this information to identify which pointers cannot possibly have values from prior loop iterations. The approach is based on the observation that any loop-carried self-interference must involve an object pointer that is live across a loop back-edge. Each back-edge leads to the loop entry block, so all loop carried self-interferences must involve objects that may be pointed to at the start of the loop entry block.

The allocation interference logic 218 can also discover points in a loop reached by pointer values that have survived a loop back-edge. In an exemplary embodiment, the analysis matrices 212 are augmented with a danger column for each loop. Loops at the same nesting depth can share a danger column, since two natural loops at the same depth cannot be active at the same time. At each loop entry point, the allocation interference logic 218 can set danger indicators in the danger column for the associated loop on each live pointer. Upon completing the dataflow analysis, the places in the loop where the danger indicator is set are exactly those places where a pointer may point to an object allocated in a prior loop iteration. A pointer P is said to endanger an allocation A at some point if, at that point, P may point to A, and one of the danger indicators in P's row is set.

Therefore, the allocation interference logic 218 may add a danger column to a matrix of the analysis matrices 212 for each loop nesting depth in the sequence of computer instructions of the non-optimized intermediate code 208 of FIG. 2. At each loop entry point in the sequence of computer instructions, the allocation interference logic 218 can clear all danger columns of the matrix representing deeper loops, and set danger indicators in danger columns of the matrix representing depths of loops for which a current loop entry point under analysis is the loop entry point. The allocation interference logic 218 may then indicate a self interference at a selected object allocation node only where there is at least one live pointer with a danger indicator set for the selected object allocation node. A self interference at a selected field store can be indicated through a first live pointer that may point to a given object allocation node and a second live pointer also may point to the given object allocation node as defined via the matrix, where at least one of the first and second live pointers has one or more danger indicators set at the selected field store.

A loop control flow graph, such as control flow graph 210 of FIG. 2, can be handled by the allocation interference logic 218 as follows. The allocation interference logic 218 and/or the compiler 202 can compute a nesting depth of the current loop using, for instance, interval or structural analysis. The allocation interference logic 218 can identify a set of control edges in the control flow graph 210 representing the current loop such that upon removal, the control flow graph representing the current loop is acyclic. Head blocks of the set of control edges can be identified as the loop entry point. If the allocation interference logic 218 and/or the compiler 202 cannot determine a nesting depth for improper loops, such loops can be considered to be at the same depth as a natural loop containing the improper loops. If the allocation interference logic 218 and/or the compiler 202 cannot determine natural loop nesting depths, all loops can be considered to be at the same depth.

Figure 6:
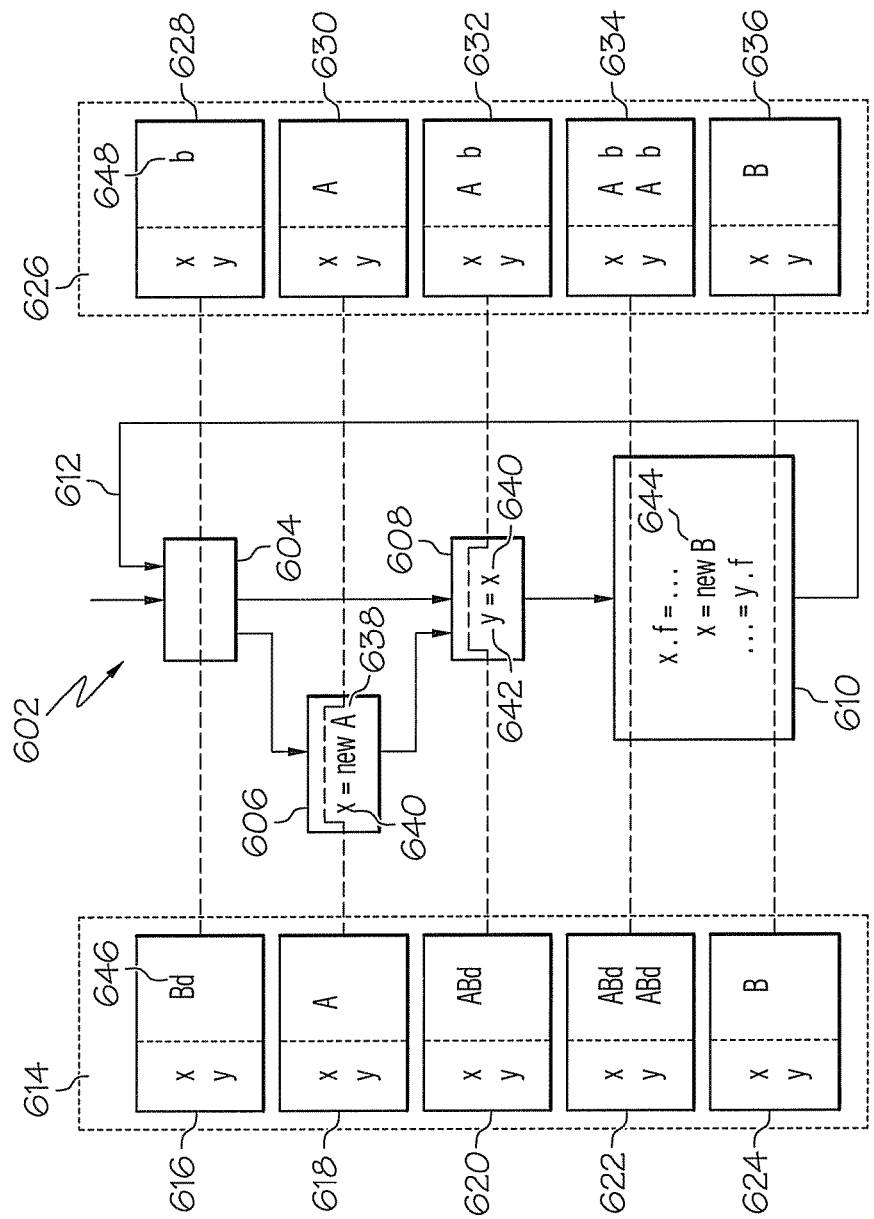
FIG. 6 depicts examples of analysis matrices associated with non-optimized intermediate code partitioned into a control flow graph in accordance with exemplary embodiments.

FIG. 6 depicts examples of analysis matrices associated with non-optimized intermediate code partitioned into a control flow graph in accordance with exemplary embodiments. Control flow graph 602 represents an example of the control flow graph 210 of FIG. 2 that includes a sequence of instructions partitioned as non-optimized intermediate code 214 into various blocks at program points. Block 604 is a loop entry point that can flow to block 606 and block 608. Block 606 flows to block 608, and block 608 flows to block 610. Block 610 is the back edge of a loop, which returns control flow back to block 604 via edge 612. Sequence 614 indicates possible matrix values in the analysis matrices 214 at program points as matrix states 616, 618, 620, 622, and 624 for an embodiment of the allocation interference logic 218. Sequence 626 indicates possible matrix values in the analysis matrices 214 at program points as matrix states 628, 630, 632, 634, and 636 for an alternate embodiment of the allocation interference logic 218. Sequence 614 is an example of a per-loop danger indicator, and sequence 626 is an example of a per-allocation danger indicator.

Block 606 allocates object A 638, as pointed to by pointer x 640. Block 608 sets pointer y 642 equal to pointer x 640. Block 610 performs a field store using pointer x 640 and then assigns pointer x 640 to newly allocated object B 644, followed by an access of field f via pointer y 642. Matrix states 616 and 628 correspond to block 604, with both matrix states 616 and 628 including rows for pointer x 640 and pointer y 642. Matrix state 616 includes object allocation of object B 644, as well as danger indicator 646, which is set on loop entry for all live pointers. Matrix state 628 includes a loop back-edge indicator. Matrix states 618 and 630 correspond to the end of block 606, resulting in updating pointer x 640, which sets object A 638 in rows for pointer x 640 in both the matrix states 618 and 630. Matrix states 620 and 632 represent the merger point of blocks 604 and 606; therefore, matrix state 620 is a combination of matrix states 616 and 618, and matrix state 632 is a combination of matrix states 628 and 630. Matrix states 622 and 634 correspond to the entry point of block 610, after pointer y 642 has been set equal to pointer x 640. Matrix states 624 and 636 correspond to the exit point of block 610, after pointer x 640 has been assigned to object B 644.

In FIG. 6, the capital letters "A" and "B" in matrices 616-624 and 628-636 are may-point-to indicators for an allocation, while the danger indicators are depicted using lower-case letters. Lower case "d" 646 indicates a generic danger condition without knowledge of a specific allocation in danger. The embodiment depicted in sequence 614 sets the danger indicator on each live pointer at the start of the entry block 604 to the loop. By contrast, the embodiment depicted in sequence 626 sets the per-allocation danger bit 648 by a "pre-processing" step as follows. To compute matrix 628, predecessors of block 604 are considered. Block 610 is a predecessor of block 604, which transfers control to block 604 via edge 612. Edge 612 is considered to be in a set of control edges in control flow graph 602 such that upon removal of the set of control edges, the control flow graph 602 would be acyclic because it is the back-edge of a natural loop. Hence, to compute matrix 628, it is not simply a copy of matrix 636; rather, matrix 628 is pre-processed by replacing each allocation's indicator by the corresponding danger indicator. The result turns capital letter "B" in matrix 636 into lower-case letter "b" 648 in matrix 628, which indicates a danger condition rather than a may-point-to condition.

Converting a letter to lower-case indicates that an object has survived across at least one back-edge, which is what leads to the "danger" of incorrectness if the object were to undergo self-collocation. "Self-collocation" means that multiple objects allocated by the same allocation, in a loop, would be collocated with each other. The danger bits indicate when a self-collocation could change the behavior of the program. This is in contrast to the code example shown in Table 3, where there is no such loop, and hence no such danger. In the example of Table 3, either embodiment of the danger analysis described here would conclude that there is no danger.

A notable difference between sequences 614 and 626 in FIG. 6 can be seen in comparing matrices 622 and 634. Matrices 622 and 634 represent the same program point at which the program is about to perform a field store through pointer x. Matrix 634 indicates that "A" is not in danger as the row for x contains no lower-case "a", but in matrix 622, the situation is ambiguous since the row for x contains an "A" and a "B", as well as a "d" indicating danger without identifying a specific allocation in danger. Since it is uncertain whether allocation A is in danger, a self-interference is added and allocation A is removed from consideration for collocation. Using the analysis of sequence 614 may result in missing an opportunity to stack-allocate or scalarize A, while the analysis of sequence 626 would catch the opportunity. Note that in any case, A and B do interfere with each other, and cannot be collocated with each other without applying additional code transformations, such as field preloading.

The analysis for sequence 614 remains useful despite being less powerful than that for sequence 626 because it consumes fewer system resources than the analysis for sequence 626. For instance, sequence 614 may require fewer columns in the associated matrices, while catching many collocation opportunities, particularly where there are no loops involved.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects include supporting object collocation at compile-time to optimize memory usage, which can reduce the amount of memory required to execute a sequence of instructions and may reduce the number of resulting executable instructions, while maintaining equivalent functionality. Object collocation can enable other optimization techniques, such as scalarization, to perform optimization of code that otherwise would have violated prerequisite rules of scalarization. Additionally, allocation interference graphs constructed during collocation analysis may also be used to improve object locality. For example, if interference edges of an allocation interference graph are weighted by an expected execution frequency of the code that caused the edges, then the allocation interference graph can guide stack frame layout decisions to cause objects used together to be allocated near each other within a proximity threshold, thereby improving spatial locality.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A method for performing object collocation when compiling computer instructions on a computer system, the method comprising:

analyzing, a sequence of the computer instructions, to identify object allocations and uses of the allocated objects;

creating, in a memory of the computer system, an allocation interference graph of object allocation nodes with edges indicating pairs of object allocations to be omitted from collocation due to interference by:
  computing may-point-to information for the sequence of the computer instructions, indicating a set of allocations to which each pointer may point when the sequence of the computer instructions is executed;
  inspecting the sequence of the computer instructions and the may-point-to information to determine which allocations interfere;
  indicating an interference at each allocation instruction between an associated allocation and one or more other allocations that may be pointed to as identified using the may-point-to information;
  indicating an interference at each field store instruction through a pointer between objects that the pointer may point to and one or more allocations that may be pointed to by other pointers, as identified using the may-point-to information at each field store instruction;
  indicating an interference at each comparison of a pair of live pointers between one or more objects that the pair of live pointers may point to;
  indicating an interference at each method call between one or more objects that may be pointed to by arguments of each method; and
  removing self-interfering allocations from the allocation interference graph;
coloring the allocation interference graph such that adjacent nodes are assigned different colors;
creating an object allocation at a program point prior to allocations of a selected color from the allocation interference graph;
storing, in the memory of the computer system, an address associated with the created object allocation in a collocation pointer; and
replacing a use of each allocation of the selected color with a use of the collocation pointer to collocate multiple objects.

2. The method of claim 1 further comprising:
performing a liveness analysis on the sequence of the computer instructions to identify dead pointers that are not used at a later point of program execution; and
clearing entries representing dead pointers from the may-point-to information.

3. The method of claim 1 further comprising:
augmenting the may-point-to information with danger indicators indicating that the pointers may point to allocations from prior iterations of a loop;
identifying a set of control edges in a control flow graph associated with a portion of the sequence of the computer instructions such that upon removal of the set of control edges, the control flow graph would be acyclic;
setting danger indicators at a target block of each control edge in the set of control edges based on the may-point-to information from a block at a tail of one or more of the control edges in the set of control edges; and
indicating an interference between an allocation and itself only where a pointer causing the interference may point to that allocation from a prior iteration of a loop as indicated by the danger indicators.

4. The method of claim 3 wherein one danger indicator is assigned per allocation.

5. The method of claim 3 wherein one danger indicator is assigned per loop-nesting level.

6. The method of claim 1 further comprising:
allocating the collocated multiple objects to stack memory in the computer system; and
performing scalarization on the collocated multiple objects, the scalarization exploding the collocated multiple objects into a local variable for each field of the collocated multiple objects.

7. The method of claim 6 further comprising:
guiding stack frame layout using the allocation interference graph to cause objects used together to be allocated near each other within a proximity threshold.

8. A system for object collocation, comprising:
a compiler and allocation interference logic configured to execute on a data processing system to perform a method comprising:
analyzing a sequence of computer instructions in a memory of the data processing system to identify object allocations and uses of the allocated objects;
creating an allocation interference graph of object allocation nodes with edges indicating pairs of object allocations to be omitted from collocation due to interference by:
  computing may-point-to information for the sequence of computer instructions, indicating a set of allocations to which each pointer may point when the sequence of computer instructions is executed;
  inspecting the sequence of computer instructions and the may-point-to information to determine which allocations interfere;
  indicating an interference at each allocation instruction between an associated allocation and one or more other allocations that may be pointed to as identified using the may-point-to information;
  indicating an interference at each field store instruction through a pointer between objects that the pointer may point to and one or more allocations that may be pointed to by other pointers, as identified using the may-point-to information at each field store instruction;
  indicating an interference at each comparison of a pair of live pointers between one or more objects that the pair of live pointers may point to;
  indicating an interference at each method call between one or more objects that may be pointed to by arguments of each method; and
  removing self-interfering allocations from the allocation interference graph;
coloring the allocation interference graph such that adjacent nodes are assigned different colors;
creating an object allocation at a program point prior to allocations of a selected color from the allocation interference graph;
storing an address associated with the created object allocation in a collocation pointer; and
replacing a use of each allocation of the selected color with a use of the collocation pointer to collocate multiple objects in the memory of the data processing system.

9. The system of claim 8 wherein the system is further configured to perform the method comprising:
performing a liveness analysis on the sequence of computer instructions to identify dead pointers that are not used at a later point of program execution; and
clearing entries representing dead pointers from the may-point-to information.

10. The system of claim 8 wherein the system is further configured to perform the method comprising:

augmenting the may-point-to information with danger indicators indicating that the pointers may point to allocations from prior iterations of a loop;

identifying a set of control edges in a control flow graph associated with a portion of the sequence of computer instructions such that upon removal of the set of control edges, the control flow graph would be acyclic;

setting danger indicators at a target block of each control edge in the set of control edges based on the may-point-to information from a block at a tail of one or more of the control edges in the set of control edges; and indicating an interference between an allocation and itself only where a pointer causing the interference may point to that allocation from a prior iteration of a loop as indicated by the danger indicators.

11. A computer program product for performing object collocation, the computer program product comprising:

a non-transitory storage medium readable by a processing circuit and storing instructions for execution by the processing circuit for implementing a method, the method comprising:

analyzing a sequence of computer instructions to identify object allocations and uses of the allocated objects;

creating an allocation interference graph of object allocation nodes with edges indicating pairs of object allocations to be omitted from collocation due to interference by:

computing may-point-to information for the sequence of computer instructions, indicating a set of allocations to which each pointer may point when the sequence of computer instructions is executed;

inspecting the sequence of computer instructions and the may-point-to information to determine which allocations interfere;

indicating an interference at each allocation instruction between an associated allocation and one or more other allocations that may be pointed to as identified using the may-point-to information;

indicating an interference at each field store instruction through a pointer between objects that the pointer may point to and one or more allocations that may be pointed to by other pointers, as identified using the may-point-to information at each field store instruction;

indicating an interference at each comparison of a pair of live pointers between one or more objects that the pair of live pointers may point to;

indicating an interference at each method call between one or more objects that may be pointed to by arguments of each method; and removing self-interfering allocations from the allocation interference graph;

coloring the allocation interference graph such that adjacent nodes are assigned different colors;

creating an object allocation at a program point prior to allocations of a selected color from the allocation interference graph;

storing an address associated with the created object allocation in a collocation pointer; and replacing a use of each allocation of the selected color with a use of the collocation pointer to collocate multiple objects.

12. The computer program product of claim 11 wherein the method further comprises:

performing a liveness analysis on the sequence of computer instructions to identify dead pointers that are not used at a later point of program execution; and clearing entries representing dead pointers from the may-point-to information.

13. The computer program product of claim 11 wherein the method further comprises:

augmenting the may-point-to information with danger indicators indicating that the pointers may point to allocations from prior iterations of a loop;

identifying a set of control edges in a control flow graph associated with a portion of the sequence of computer instructions such that upon removal of the set of control edges, the control flow graph would be acyclic;

setting danger indicators at a target block of each control edge in the set of control edges based on the may-point-to information from a block at a tail of one or more of the control edges in the set of control edges; and indicating an interference between an allocation and itself only where a pointer causing the interference may point to that allocation from a prior iteration of a loop as indicated by the danger indicators.

14. The computer program product of claim 13 wherein one danger indicator is assigned per allocation or per loop-nesting level.

* * * * *